2 Sheets—Sheet 1.

J. B. ROOT.
MACHINE FOR MAKING METALLIC TUBING.

No. 183,327. Patented Oct. 17, 1876.

Witnesses:
Robert H. Duncan
A. B. Jones

Inventor:
John B. Root
by Saml A. Duncan
his Atty.

2 Sheets—Sheet 2.

J. B. ROOT.
MACHINE FOR MAKING METALLIC TUBING.

No. 183,327. Patented Oct. 17, 1876.

Witnesses:
Robert H. Duncan
A. B. Jones

Inventor:
John B. Root
by Saml. A. Duncan
his Atty.

UNITED STATES PATENT OFFICE.

JOHN B. ROOT, OF NEW YORK, N. Y.

IMPROVEMENT IN MACHINES FOR MAKING METALLIC TUBING.

Specification forming part of Letters Patent No. 183,327, dated October 17, 1876; application filed April 17, 1876.

*To all whom it may concern:*

Be it known that I, JOHN B. ROOT, of the city and State of New York, have invented certain new and useful Improvements in the Manufacture of Metal Pipes and Tubes, of which the following is a specification:

This invention relates particularly to the manufacture of spirally-wound metal pipes and tubes, or pipes and tubes in which the seam, formed by the interlocking or overlapping of the edges of the blank, passes spirally around the cylinder; and the invention consists, in general terms, in the arrangement, in connection with the machine, upon which the blank or skelp is reduced to a tubular form, of a furnace and other appliances, all as hereinafter more fully described, by means of which the seam or joint can be properly heated and welded as the tube passes off from the mandrel or former of the winding-machine.

The invention is illustrated in the accompanying drawings, in which—

Figure 1:
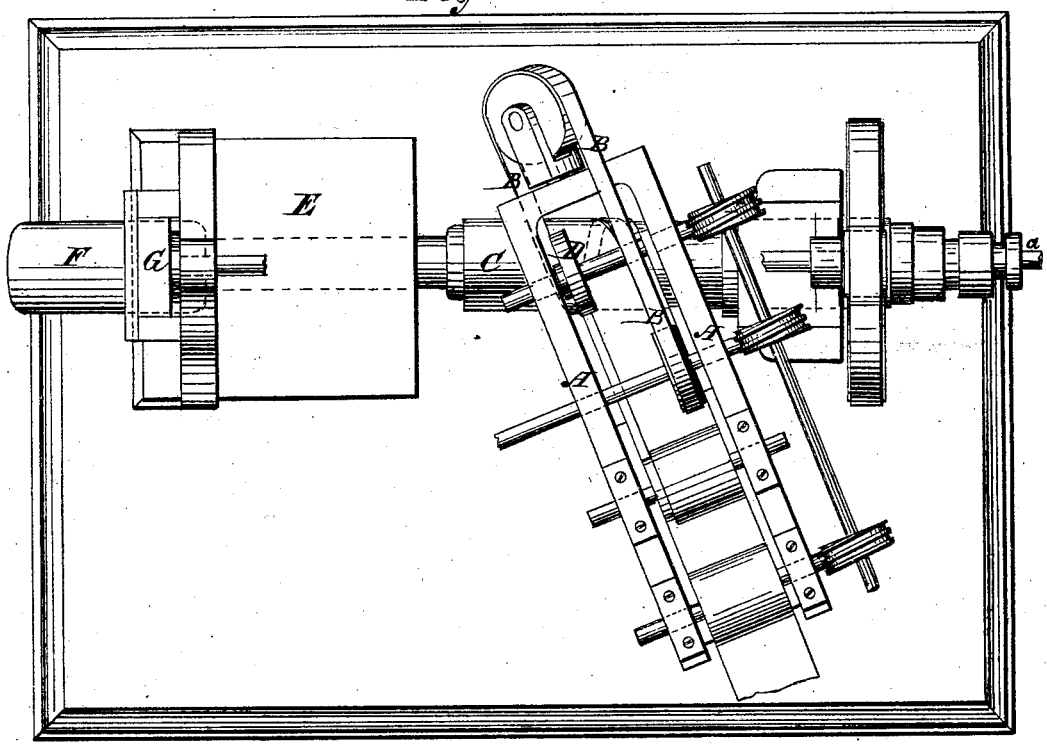
Figure 3:
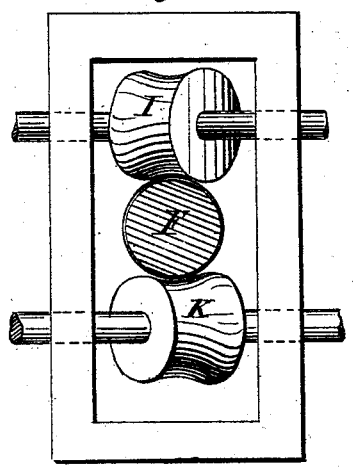
Figure 4:
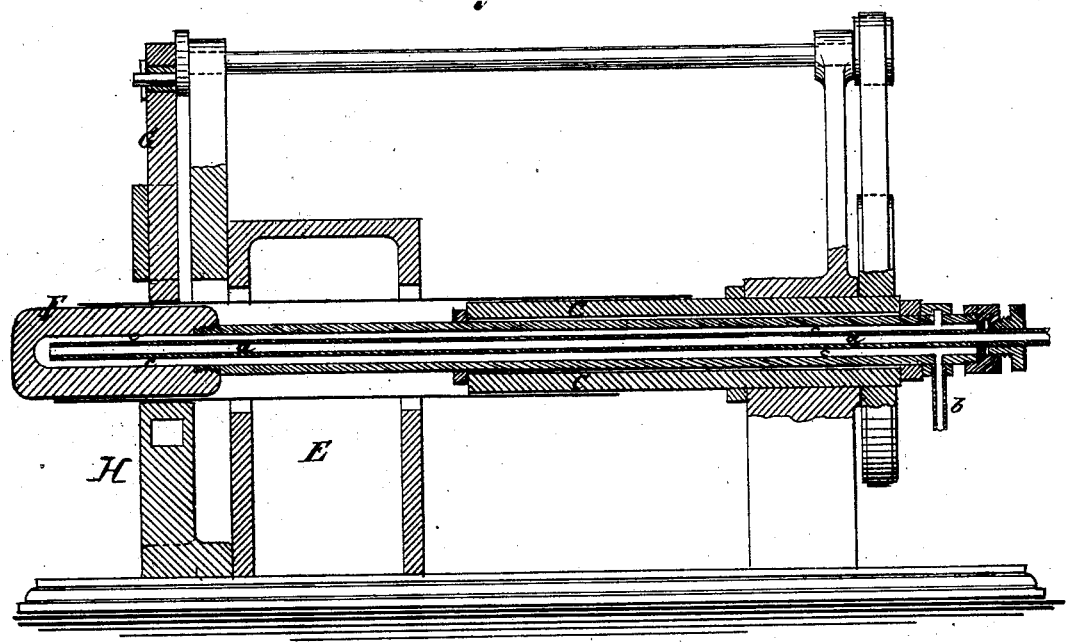
Figure 2:
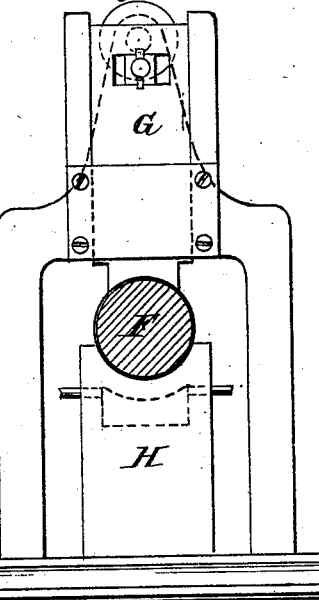
Figure 5:
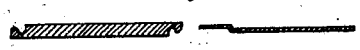
Figure 6:

Figure 1 is a plan view of the several parts, as arranged for work. Fig. 2 is an end elevation of the welding mechanism, when the same consists of a hammer and anvil die. Fig. 3 is a different form of welding mechanism, in elevation, consisting of a pair of crossed rolls. Fig. 4 is a longitudinal vertical section of the mandrels, furnace, and welding mechanism. Figs. 5 and 6 are transverse sections of different forms of blanks, with the edges already shaped for the action of the winding-mandrel.

The invention embraces four general subdivisions: First, a guide or roll frame by means of which the blank is supported and guided in its passage to and entry upon the winding-mandrel, and which, if occasion requires, is to be provided with suitable beading and flanging rolls for giving the edges of the blank the proper shape for producing the desired form of interlocking or overlapping seam; second, a mandrel upon which the blank is wound spirally into a tubular form, as it leaves the guide or roll frame; third, a furnace located in the line of the extension of the winding-mandrel, for reheating the tubing as it feeds off from the mandrel, and bringing it to a welding state; fourth, a welding mechanism, located at or near the point where the tubing issues from the furnace.

The guide or roll-frame (represented in the drawings at A) may be made in any suitable way adapted to the end in view; but it should be capable of delivering the blank upon the mandrel at an acute angle therewith. If thin sheet metal be used this guide-frame may be provided with die-rolls for shaping the edges, so as to produce the desired form of lock or lap for the seam or joint; and even when a heavier metal is used the frame may be provided with milling-rolls for grooving or otherwise shaping the edges of the skelp. The edges of the blank or skelp may also be shaped before the blank is fed into the guide-frame.

The blank may be pushed forward through the guide-frame by means of feed-rolls, or it may be drawn forward by means of a traveling belt, B, suitably mounted and driven, and passing spirally around the mandrel, or any other means that will cause the work to pass through the machine may be used.

Preferably the guide-frame should be made laterally expansive to accommodate it to different widths of blanks, and should likewise be capable of adjustment at different angles with the mandrel, according to the diameter of the peculiar mandrel used or the width of the particular blank that is being worked.

As the special construction and operation of the guide-frame (beyond the general features above indicated) form no part of the present invention, a more detailed description of it is unnecessary. The full details of a practical mechanism for this purpose will be found in an application relating specially thereto, filed by me in the Patent Office of the United States on or about the 10th day of April, 1876.

The mandrel C is placed at the delivery end of the roll-frame, and is to be provided with suitable guides for giving direction to the blank after it leaves such roll-frame, and causing it to wind spirally around the mandrel. Preferably, also, this mandrel should be made to revolve, which may be effected by any suitable connection with the main shaft, in which event the revolution of the mandrel can be made to aid the feeding of the work; or it can be effected by frictional contact with the blank or skelp in winding around it. By making the mandrel-bearing vertically adjustable upon its supporting-standard, mandrels of different diameters may be used interchangeably on the same machine. The full details of such a construction are given in my pending application, as above referred to.

When the machine is in operation the guide-frame should be set at such an angle with the mandrel (to be determined in each case by the width of the blank and the diameter of mandrel) that the advance edge of the blank, after having made one turn around the mandrel, will properly interlock with or underlie the other edge, and as the tubing is formed it moves longitudinally along the mandrel. When the two edges are brought together and joined it will be found advisable to set the seam down by means of a seaming-roll, D. This will prepare the work for the better action of the welding mechanism, to be hereinafter described.

At or near the end of the winding-mandrel is placed a furnace, E, in such relation to the mandrel that the pipe will feed directly from it into and through the furnace. The rate of progression and the heat of the furnace should be so regulated that the pipe will be brought to a welding heat before it issues from the furnace. Inspection of the fire and of the condition of the work within the furnace will be facilitated by peep-holes provided in the walls.

No details in the construction of the furnace are shown in the drawings, since the invention does not consist in the special character of the furnace used for heating the pipe, but rather in its location relatively to the other parts of the mechanism.

Just outside the furnace is situated the welding mechanism. This consists of an internal supporting mandrel or bulb, F, and a hammer, G, and die-anvil H; or, instead of the hammer and die-anvil, two hammers may be used, acting upon the external surface of the tubing from opposite directions; and instead, again, of the hammer and die-anvil, two welding-rolls, I K, may be used.

The advantage of the hammer or drop over the rolls, when the seam of the tubing is such as to give the finished article a smooth exterior, lies in the fact that by making the face of the hammer or hammers sufficiently broad not only will the seam be welded, but every part of the exterior of the tubing will be hammered, and thus planished and made more dense.

If desired, the hammer and anvil, or hammers, can be used in addition to the rolls, the rolls serving to weld the seam and the hammers afterward planishing the surface.

The die-anvil, when used, should be made hollow, and provided with a copious flow of water for keeping it cool.

The hammer may be operated by any suitable connection with the driving-shaft. The arrangement, however, should be such as to cause it to deliver well-defined blows with greater or less force and frequency, according to the requirements of the particular case. When the rolls are used to effect the welding their axes must be set crosswise to each other, as shown. The connections for giving these rolls their respective revolutions are not shown.

The welding mandrel or bulb is supported by a stem which extends axially from the winding-mandrel. It may be rigidly connected with the winding-mandrel, or, as shown in the drawings, extend longitudinally through it. Under the latter construction, the welding-mandrel can be made to revolve with a motion communicated from the revolving pipe, or, if desired, it can, by suitable mechanism, be made to revolve in a direction opposite to that of the forming-tube, and thus serve to some extent to render the interior of the tube smoother.

For the purpose of keeping the bulb of the welding-mandrel cool, a current of water is passed through it. This is to be effected, in the usual manner of accomplishing such results under similar circumstances, by means of a hollow rod or pipe, $a$, the water being forced in through such pipe, and returning to the discharge-pipe $b$ through the annular space $c$ around the pipe $a$. It will be observed that, by reason of the tubing, which, in the process of formation, encircles both the winding and the welding mandrel, it becomes necessary that this current of water shall pass longitudinally through the winding-mandrel.

While ordinarily the bulb of the welding-mandrel will be of substantially the same diameter as that of the winding-mandrel, its stem, where it passes through the furnace, should be smaller, and, preferably, it should be wound with asbestus, or provided with some other non-conducting coating, the object being to prevent as far as possible any abstraction through this channel of the heat communicated to the tubing by the fires of the furnace.

Instead of the welding-mandrel above described, an internal friction-roll might be used, such roll being supported on an arm extending axially from the end of the winding-mandrel; and it is conceivable, also, that, instead of winding the blank into tubular form by means of a mandrel, this portion of the work may be accomplished by causing the blank to follow the interior surface of a hollow cylindrical former.

For leading the finished tubing away from the welding mechanism, friction-rolls may be employed in number as required. If these leading rolls are driven they will aid materially in relieving the strain upon the various parts of the mechanism when extended lengths of tubing are being made.

Fig. 5 contains transverse sections of two forms of blanks which are adapted for being worked up into welded tubing with spiral seam by the method above set forth; but, instead of shaping the edges of the blank so as to make a simple lap, it may be found advisable, in order to prevent all displacement of the parts when passing through the furnace, to shape the edges somewhat as shown in Fig. 6.

The method above described of making welded pipe is believed to be greatly superior to that adopted when the pipe is made with the ordinary longitudinal seam. In this latter case the pipe must be made in short lengths, and these separate lengths, when placed in the furnace, are liable to collapse or become warped; but when the pipe is made with a spiral seam it can be formed in continuous lengths of any desired extent, and, if the furnace be properly located as above described, the pipe can be made to feed directly from the winding-machine into and through the furnace, and, by reason of the support which it receives both at the entrance to and the exit from the furnace, the danger of collapsing will be greatly reduced if not entirely overcome.

If the furnace should be wholly omitted it might still be found desirable in some instances to use the hammer and anvil, or a pair of hammers in connection with the winding-machine, for the more completely setting down the seam, or for planishing the surface of the tube.

What is claimed as new is—

1. The combination of the revolving mandrel and the furnace, the two being so situated relatively to each other that the tubing is carried forward with the revolution of the mandrel into and through the furnace, substantially as and for the purpose set forth.

2. The combination and arrangement, substantially as and for the purpose set forth, of a machine for winding blanks or skelps of metal spirally into tubular form, with interlocking or overlapping edges, and a furnace for heating the tubing thus formed as it passes off from the mandrel.

3. The combination and arrangement, substantially as and for the purpose set forth, of a machine for winding blanks or skelps of metal spirally into tubular form, a furnace for heating the tubing as it passes off from the machine, and a hammer or rolls for welding and finishing the tubing as it comes from the furnace.

4. In combination with the winding-mandrel and the furnace, a welding-mandrel, projecting axially from the former, the stem of the welding-mandrel where it passes through the furnace being made of a less diameter than the winding-mandrel, substantially as and for the purpose described.

5. The combination of the winding and the welding mandrel, substantially as set forth, the former being made hollow for the purpose of passing currents of water into the latter for keeping it cool.

6. The combination and arrangement, substantially as and for the purpose set forth, of a machine for winding blanks or skelps of metal spirally into tubular form, and a hammer or hammers, operating substantially as described, to finish the seam and the surface of the tubing.

JOHN B. ROOT.

Witnesses:
 THOS. P. HOW,
 ROBT. H. DUNCAN.